(12) United States Patent
Kamono et al.

(10) Patent No.: US 9,045,135 B2
(45) Date of Patent: Jun. 2, 2015

(54) DRIVE CONTROL DEVICE FOR HYBRID VEHICLE

(75) Inventors: Tsugutaka Kamono, Hamamatsu (JP); Yoshiki Ito, Hamamatsu (JP)

(73) Assignee: SUZUKI MOTOR CORPORATION, Hamamatsu-shi, Shizuoka (JP)

( * ) Notice: Subject to any disclaimer, the term of this patent is extended or adjusted under 35 U.S.C. 154(b) by 85 days.

(21) Appl. No.: 13/984,873

(22) PCT Filed: Feb. 17, 2011

(86) PCT No.: PCT/JP2011/053364
§ 371 (c)(1),
(2), (4) Date: Oct. 22, 2013

(87) PCT Pub. No.: WO2012/111122
PCT Pub. Date: Aug. 23, 2012

(65) Prior Publication Data
US 2014/0052320 A1    Feb. 20, 2014

(51) Int. Cl.
| | |
|---|---|
| *B60L 11/00* | (2006.01) |
| *B60W 20/00* | (2006.01) |
| *B60K 6/445* | (2007.10) |
| *B60W 10/06* | (2006.01) |
| *B60W 10/08* | (2006.01) |
| *B60W 10/26* | (2006.01) |
| *B60W 50/06* | (2006.01) |
| *B60W 50/00* | (2006.01) |

(52) U.S. Cl.
CPC ............. *B60W 20/108* (2013.01); *B60K 6/445* (2013.01); *B60W 10/06* (2013.01); *B60W 10/08* (2013.01); *B60W 10/26* (2013.01); *B60W 20/00* (2013.01); *B60W 50/06* (2013.01); *B60W 2050/0008* (2013.01); *B60W 2050/0042* (2013.01); *B60W 2710/0644* (2013.01); *B60W 2710/0677* (2013.01); *B60W 2710/083* (2013.01); *Y02T 10/6239* (2013.01); *Y02T 10/6286* (2013.01); *Y10S 903/93* (2013.01)

(58) Field of Classification Search
CPC combination set(s) only.
See application file for complete search history.

(56) References Cited

U.S. PATENT DOCUMENTS

| | | | |
|---|---|---|---|
| 7,431,111 B2 * | 10/2008 | Nada | 180/65.28 |
| 7,609,011 B2 | 10/2009 | Yatabe et al. | |
| 2002/0094908 A1 * | 7/2002 | Urasawa et al. | 477/3 |

(Continued)

FOREIGN PATENT DOCUMENTS

| | | |
|---|---|---|
| JP | 2004-262275 A | 9/2004 |
| JP | 2006-50704 A | 2/2006 |

(Continued)

OTHER PUBLICATIONS

Form PCT/ISA/210 International Search Report issued in International Application No. PCT/JP2011/053364 with English translation, date of mailing May 24, 2011 (5 pages).

*Primary Examiner* — Jonathan L Sample
(74) *Attorney, Agent, or Firm* — Flynn, Thiel, Boutell & Tanis, P.C.

(57) ABSTRACT

Drivability and the drive feeling are improved by optimizing a change and a delay in the torque of an internal combustion engine so as not to influence driving torque at the time of decelerating the internal combustion engine as in the initial period of deceleration by using a target driving power setting device, a target charge/discharge power setting device, a target engine power calculating device, a target engine operating point setting device, and a motor torque instruction value calculating device.

2 Claims, 18 Drawing Sheets

(56) References Cited

U.S. PATENT DOCUMENTS

| | | |
|---|---|---|
| 2008/0297073 A1 | 12/2008 | Yatabe et al. |
| 2008/0306643 A1* | 12/2008 | Hanyu et al. .................... 701/22 |
| 2012/0109438 A1* | 5/2012 | Akebono et al. ................ 701/22 |
| 2012/0197509 A1* | 8/2012 | Watanabe ..................... 701/102 |
| 2012/0203406 A1* | 8/2012 | Akebono et al. ................ 701/22 |
| 2013/0211692 A1* | 8/2013 | Asami .......................... 701/103 |
| 2013/0226380 A1* | 8/2013 | Ando et al. ..................... 701/22 |
| 2013/0304294 A1* | 11/2013 | Hosoe et al. .................... 701/22 |
| 2014/0020363 A1* | 1/2014 | Sasaki ............................ 60/274 |
| 2014/0052320 A1* | 2/2014 | Kamono et al. ................ 701/22 |

FOREIGN PATENT DOCUMENTS

| | | |
|---|---|---|
| JP | 2006-63865 A | 3/2006 |
| JP | 2007-22483 A | 2/2007 |
| JP | 2008-12992 A | 1/2008 |

\* cited by examiner

TARGET DRIVING FORCE SEARCH MAP

TARGET ENGINE OPERATING POINT SEARCH MAP

ALIGNMENT CHART IN CASE WHERE VEHICLE SPEED
CHANGES AT SAME ENGINE OPERATING POINT

ALIGNMENT CHART OF POINTS (D, E, AND F) ON EQUI-POWER LINE

ALIGNMENT CHART IN STATE OF LOW GEAR RATIO

ALIGNMENT CHART IN STATE OF
INTERMEDIATE GEAR RATIO

ALIGNMENT CHART IN STATE OF HIGH GEAR RATIO

ALIGNMENT CHART IN STATE IN WHICH
CIRCULATION OF POWER OCCURS (A)

(B)

DRIVE CONTROL DEVICE FOR HYBRID VEHICLE

TECHNICAL FIELD

The present invention relates to a drive control device of a hybrid vehicle that includes an internal combustion engine and a plurality of motor generators as power sources, combines the power thereof, and inputs or outputs the combined power to or from a driving shaft, and more particularly, to a drive control device of a hybrid vehicle that performs torque control of a plurality of motor generators.

BACKGROUND ART

Conventionally, as a form of a hybrid vehicle including an electric motor and an internal combustion engine other than a serial form and a parallel form, as disclosed in U.S. Pat. Nos. 3,050,125, 3,050,138, 3,050,141, 3,097,572, and the like, there is a form in which the torque of the power of the internal combustion engine is converted by dividing the power of the internal combustion engine to a power generator and a driving shaft using one planetary gear mechanism (a differential gear mechanism having three rotating components) and two electric motors and driving an electric motor arranged at the driving shaft by using electric power generated by the power generator. This will be referred to as a "three-axis type".

According to this conventional technology, the engine operating point of the internal combustion engine can set to an arbitrary point including stop, and accordingly, the fuel efficiency can be improved. However, although not as much as for the serial form, since an electric motor having relatively high torque is necessary for acquiring sufficient driving-shaft torque, and the amount of transmission and reception of electric power between the power generator and the electric motor increases in a low gear ratio region, the electric loss increases, and there is still a room for improvement.

As methods for solving this point, there are methods disclosed in U.S. Pat. No. 3,578,451 and Japanese Patent Application Laid-Open (JP-A) No. 2004-15982, and JP-A Nos. 2002-281607 and 2008-12992 applied by the applicants of the present invention.

In the method disclosed in JP-A No. 2002-281607, a driving shaft connected to an output shaft of an internal combustion engine, a first motor generator (hereinafter, referred to as "MG1"), a second motor generator (hereinafter, referred to as "MG2"), and a drive wheel is connected to each rotating component of a differential gear mechanism having four rotating components, the power of the internal combustion engine and the power of the MG1 and MG2 are combined, and the combined power is output to the driving shaft.

In addition, in the method disclosed in JP-A No. 2002-281607, by arranging an output shaft of an internal combustion engine and a drive shaft connected to a drive wheel in a rotating component arranged on the inner side on an alignment chart and arranging the MG1 (the internal combustion engine side) and MG2 (the driving shaft side) in a rotating component disposed on the outer side on the alignment chart, the ratio of power that is in charge of the MG1 and MG2 to the power delivered to the driving shaft from the internal combustion engine can decrease, whereby the MG1 and MG2 can be miniaturized, and the transmission efficiency of the drive device can be improved. This will be referred to as a "four-axis type".

In addition, a method disclosed in U.S. Pat. No. 3,578,451 similar to the above-described method has been proposed, in which an additional fifth rotating component is included, and a brake stopping this rotating component is arranged.

In JP-A No. 2008-12992, in a drive control device of a hybrid vehicle including an internal combustion engine and a plurality of motor generators, a technology for controlling the internal combustion engine has been disclosed in which the engine rotation speed is set high at the operating point of the internal combustion engine.

In the above-described conventional technology, as disclosed in U.S. Pat. No. 3,050,125, the power to be output by the internal combustion engine is calculated by adding the driving force required for the vehicle and the electric power required for charging a battery, and, out of a combination of the engine torque and the engine rotation speed corresponding to the power, a point at which the efficiency is high as possibly as can is calculated and is set as a target engine operating point. Then, the engine rotation speed is controlled by controlling the MG1 such that the engine operating point of the internal combustion engine becomes the target operating point.

In addition, in JP-A No. 2004-15982 described above, which is the case of the "four-axis type", a method of controlling the engine rotation speed and the driving force is disclosed in which the torques of the MG1 and the MG2 in a case where driving is performed in a state in which there is no charging/discharging of the battery are calculated using a torque balance equation, and feedback control of the rotation speeds of the MG1 and the MG2 is performed. However, in JP-A No. 2004-15982 described above, a case where there is charging/discharging of the battery or a case where the engine torque changes is not mentioned.

CITATION LIST

Patent Literature

[PTL 1] U.S. Pat. No. 3,050,125
[PTL 2] U.S. Pat. No. 3,050,138
[PTL 3] U.S. Pat. No. 3,050,141
[PTL 4] U.S. Pat. No. 3,097,572
[PTL 5] U.S. Pat. No. 3,578,451
[PTL 6] JP-A No. 2004-15982
[PTL 7] JP-A No. 2002-281607
[PTL 8] JP-A No. 2008-12992

SUMMARY OF INVENTION

Technical Problem

However, in a conventional drive control device of a hybrid vehicle including an internal combustion engine, the MG1, and the MG2, in order to satisfy the torque requested from the driver, target engine torque and target motor torque are controlled to be distributed. In JP-A No. 2005-237119, when torque requested from the driver changes, in order to suppress changes in the engine rotation speed and the engine torque, the rotation speeds of the MG1 and the MG2 are controlled so as to respond to the request from the driver.

However, since the response speed of the internal combustion engine at which the control is reflected is lower than that of the MG1 and the MG2, there are cases where the control of the torques of the internal combustion engine, the MG1, and the MG2 is not performed as expected when there is an abrupt change in the torque requested from the driver, and the engine rotation speed may rapidly increase, or the drivability may become unsmooth.

In JP-A No. 2008-12992 described above, in a hybrid system including an internal combustion engine and a plurality of motor generators, the technology for controlling an internal combustion engine has been disclosed in which the engine rotation speed is set high at the operating point of the internal combustion engine. However, the control of a plurality of motor generators is not clear, and the control of a plurality of motor generators in a case where the battery is charged or discharged is not clear.

In JP-A No. 2008-12992 described above, the internal combustion engine and a plurality of motor generators are mechanically operated to be connected to each other, and it is necessary to perform control with the plurality of motor generators being associated with each other so as to balance the torque thereof while the operating point of the internal combustion engine is maintained at a target value, and, in a case where the battery is charged and discharged, the electric power needs to be balanced. In other words, it is necessary to perform control such that both the torque of the plurality of motor generators and the electric power of the battery are balanced.

In addition, when the torque is controlled to be balanced with a plurality of motor generators being associated with each other, even in a case where feedback control is performed, there is inconvenience that a change in the torque of the internal combustion engine influences the driving torque depending on the content of the control process.

Thus, the applicants of the present invention have considered the operating point of the internal combustion engine and, devised a technology for performing feedback correction control so as to improve the drivability and the drive feeling by optimizing a change in the torque of the internal combustion engine so as not to influence the driving torque in a case where control is performed so as to secure both a target driving force and target charging/discharging.

However, during the control of a plurality of motor generators in a case where the battery is charged or discharged in a hybrid system including an internal combustion engine and a plurality of motor generators, in a case where a physical and spatial response delay is marked like that occurring at the time of a transient response, by performing only feedback correction control in which the torque is balanced so as to secure the target driving force and the target charging/discharging, an optimal operation may not be acquired.

In other words, in a transient response of an internal combustion engine, even when a throttle valve is controlled to be open or closed based on the request from the driver, there is a response delay due to a suction delay caused by the length of a suction pipe up to each cylinder of the internal combustion engine and a combustion stroke delay of the internal combustion engine from a suction stroke in which fuel enters the cylinder to an expansion stroke in which the combustion of the fuel occurs.

During the response relay, the torque of the internal combustion engine may not be controlled, and it is necessary to change each motor torque instruction value of the plurality of motor generators so as to satisfy the request from the driver in consideration of the response delay.

The present invention, as control of a plurality of motor generators in a hybrid system including an internal combustion engine and a plurality of motor generators in a case where there is charging/discharging of a battery, is contrived in consideration of a torque control response delay of an internal combustion engine, and an object thereof is to improve the drivability and the drive feeling by optimizing a torque change delay of the internal combustion engine at the time of decelerating the internal combustion engine as in the initial period of deceleration so as not to affect the driving torque.

Solution to Problem

According to the present invention there is provided a drive control device of a hybrid vehicle including: an internal combustion engine that includes an output shaft; a driving shaft that is connected to a drive wheel; first and second motor generators; a differential gear mechanism that includes four rotating components connected to a plurality of the motor generators, the driving shaft, and the internal combustion engine; an accelerator opening degree detecting means that detects the accelerator opening degree; a vehicle speed detecting means that detects a vehicle speed; a battery charge state detecting means that detects a charge state of a battery; a target driving power setting means that sets target driving power based on the accelerator opening degree that is detected by the accelerator opening degree detecting means and the vehicle speed detected by the vehicle speed detecting means; a target charge/discharge power setting means that sets target charge/discharge power based on at least the charge state of the battery that is detected by the battery charge state detecting means; a target engine power calculating means that calculates target engine power using the target driving power setting means and the target charge/discharge power setting means; a target engine operating point setting means that sets a target engine operating point based on the target engine power and total system efficiency; and a motor torque instruction value calculating means that sets torque instruction values of the plurality of the motor generators. The motor torque instruction value calculating means calculates torque instruction values of the plurality of motor generators using a torque balance equation including target engine torque required at the target engine operating point and an electric power balance equation including the target charge/discharge power and allows feedback correction of the torque instruction values of the plurality of the motor generators to be performed such that an actual engine rotation speed converges on a target engine rotation speed required at the target engine operating point, and a delaying means that determines a decrease in requested torque based on the accelerator opening degree detected by the accelerator opening degree detecting means and delays the target engine torque applied to the motor torque instruction value calculating means in a case where the decrease in the requested torque is determined is arranged.

Advantageous Effects of Invention

According to the present invention, by estimating a change (a delay time and a decrease tendency) in engine torque by determining a decrease in torque (target driving force) requested from a driver, the timing of a change in the torque instruction value of a motor generator and the timing of a change in the engine state can match each other, and accordingly, the rotation is stabilized, whereby the drivability can be improved.

DESCRIPTION OF EMBODIMENTS

Hereinafter, an embodiment of the present invention will be described with reference to the drawings.

Figure 1:
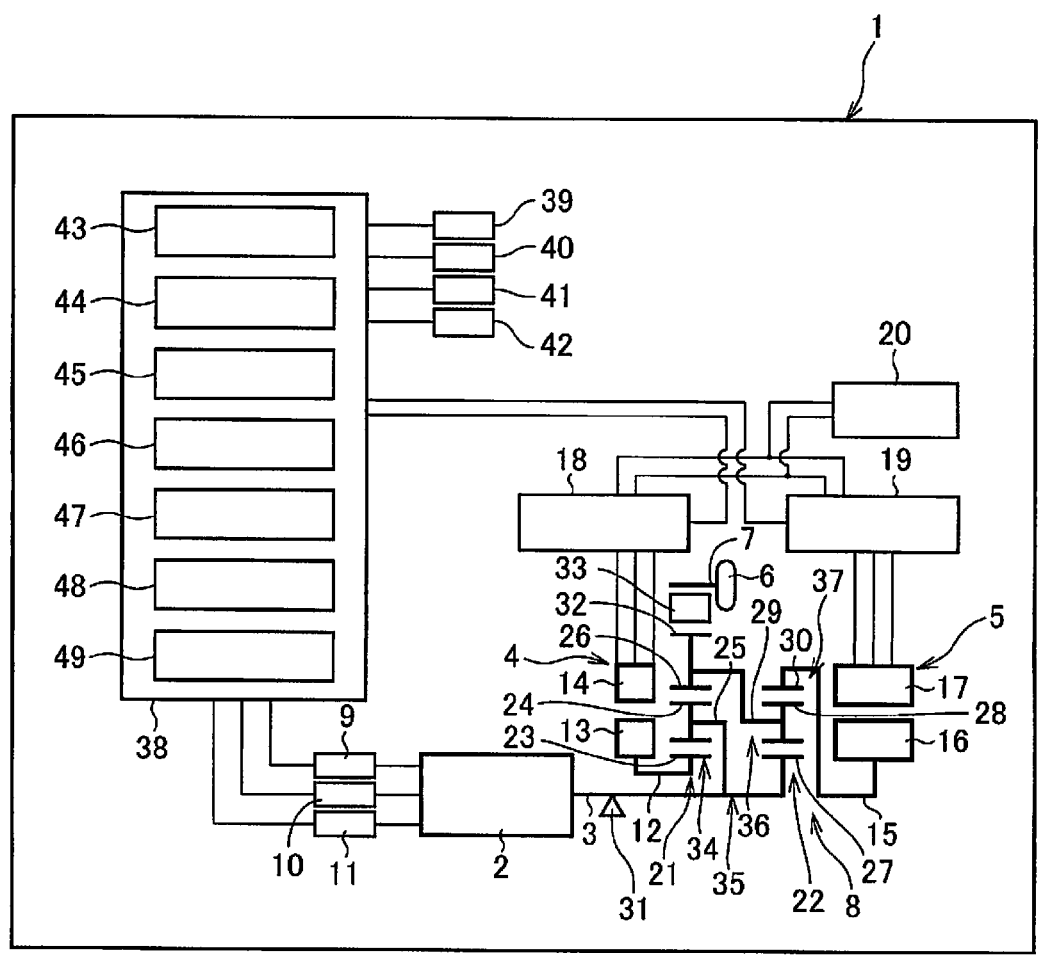
FIG. 1 is a system configuration diagram of a drive control device of a hybrid vehicle.

FIGS. 1 to 19 illustrate an embodiment of the present invention. In FIG. 1, reference numeral 1 represents a drive control device of a hybrid vehicle. The drive control device 1 of the hybrid vehicle, as a driving system, includes: an output shaft 3 of an internal combustion engine 2 that generates a driving force in accordance with combustion of fuel; a first motor generator 4 and a second motor generator 5 that generate a driving force using electricity and generate electrical energy through driving; a driving shaft 7 that is connected to a drive wheel 6 of the hybrid vehicle, and a differential gear mechanism 8 that is a power transmission system connected to the output shaft 3, the first and second motor generators 4 and 5, and the driving shaft 7.

The internal combustion engine 2 includes: an air content adjusting means 9 such as a throttle valve that adjusts the air volume to be suctioned in accordance with the accelerator opening degree (the amount of pressing an accelerator pedal using a foot); a fuel supplying means 10 such as a fuel injection valve that supplies fuel corresponding to the suctioned air volume; and an ignition means 11 such as an ignition device that ignites the fuel. In the internal combustion engine 2, the combustion state of the fuel is controlled by the air content adjusting means 9, the fuel supplying means 10, and the ignition means 11, and a driving force is generated by the combustion of the fuel.

The first motor generator 4 includes: a first motor rotor shaft 12; a first motor rotor 13; and a first motor stator 14. The second motor generator 5 includes: a second motor rotor shaft 15; a second motor rotor 16; and a second motor stator 17. The first motor stator 14 of the first motor generator 4 is connected to a first inverter 18. The second motor stator 17 of the second motor generator 5 is connected to a second inverter 19.

The power terminals of the first and second inverters 18 and 19 are connected to a battery 20. The battery 20 is an electricity accumulating means that can exchange electric power between the first motor generator 4 and the second motor generator 5. The first motor generator 4 and the second motor generator 5 generate driving forces in accordance with electricity of which the amount of electricity supplied from the battery 20 is controlled by the first and second inverters 18 and 19 and generate electrical energy using the driving force supplied from the drive wheel 6 at the time of regeneration and store the generated electrical energy in the battery 20 to be charged.

The differential gear mechanism 8 includes a first planetary gear mechanism 21 and a second planetary gear mechanism 22. The first planetary gear mechanism 21 includes: a first sun gear 23; a first planetary carrier 25 supporting a first planetary gear 24 engaged with the first sun gear 23; and a first ring gear 26 that is engaged with the first planetary gear 24. The second planetary gear mechanism 22 includes: a second sun gear 27; a second planetary carrier 29 supporting a second planetary gear 28 engaged with the second sun gear 27; and a second ring gear 30 that is engaged with the second planetary gear 28.

The differential gear mechanism 8 arranges the rotational center lines of rotating components of the first planetary gear mechanism 21 and the second planetary gear mechanism 22 on a same axis, arranges the first motor generator 4 between the internal combustion engine 2 and the first planetary gear mechanism 21, and arranges the second motor generator 5 on a side of the second planetary gear mechanism 22 that is separated away from the internal combustion engine 2. The second motor generator 5 has performance capable of driving the vehicle using only the output thereof.

The first motor rotor shaft 12 of the first motor generator 4 is connected to the first sun gear 23 of the first planetary gear mechanism 21. The first planetary carrier 25 of the first planetary gear mechanism 21 and the second sun gear 27 of the second planetary gear mechanism 22 are connected to the output shaft 3 of the internal combustion engine 2 in a combined manner through a one-way clutch 31. The first ring gear 26 of the first planetary gear mechanism 21 and the second planetary carrier 29 of the second planetary gear mechanism 22 are combined and are connected to an output unit 32. The output unit 32 is connected to the driving shaft 7 through an output transmission mechanism 33 such as a gear or a chain. The second motor rotor shaft 15 of the second motor generator 5 is connected to the second ring gear 30 of the second planetary gear mechanism 9.

The one-way clutch 31 is a mechanism that fixes the output shaft 3 of the internal combustion engine 2 so as to rotate only in the output direction and prevents the output shaft 3 of the internal combustion engine 2 from reversely rotating. The driving power of the second motor generator 5 is transmitted as driving power of the output unit 32 through a reaction force of the one-way clutch 31.

The hybrid vehicle outputs the power generated by the internal combustion engine 2 and the first and second motor generators 4 and 5 to the driving shaft 7 through the first and second planetary gear mechanisms 21 and 21, thereby driving the drive wheel 6. In addition, the hybrid vehicle transmits the driving force delivered from the drive wheel 6 to the first and second motor generators 4 and 5 through the first and second planetary gear mechanisms 21 and 22, thereby generating electrical energy so as to charge the battery 20.

The differential gear mechanism 8 sets four rotating components 34 to 37. The first rotating component 34 is formed by the first sun gear 23 of the first planetary gear mechanism 21. The second rotating component 35 is formed by combining the first planetary carrier 25 of the first planetary gear mechanism 21 and the second sun gear 27 of the second planetary gear mechanism 22. The third rotating component 36 is formed by combining the first ring gear 26 of the first planetary gear mechanism 21 and the second planetary carrier 29 of the second planetary gear mechanism 22. The fourth rotating component 37 is formed by the second ring gear 30 of the second planetary gear mechanism 22.

The differential gear mechanism 8, as illustrated in FIGS. 9 and 12 to 16, on an alignment chart in which the rotation speeds of four rotating components 34 to 37 can be represented as a straight line, sets the four rotating components 34 to 37 as the first rotating component 34, the second rotating component 35, the third rotating component 36, and the fourth rotating component 37 from one end (the left side in each figure) toward the other end (the right side in each figure) in order. A ratio of distances among the four rotating components 34 to 37 is represented as k1:1:k2. In each figure, MG1 represents the first motor generator 4, MG2 represents the second motor generator 5, ENG represents the internal combustion engine 2, and OUT represents the output unit 32.

The first motor rotor shaft 12 of the first motor generator 4 is connected to the first rotating component 34. The output shaft 3 of the internal combustion engine 2 is connected to the second rotating component 35 through the one-way clutch 31. The output unit 32 is connected to the third rotating component 36. The driving shaft 7 is connected to the output unit 32 through the output transmission mechanism 33. The second motor rotor shaft 15 of the second motor generator 5 is connected to the fourth rotating component 37.

From this, the differential gear mechanism 8 includes the four rotating components 34 to 37 connected to the output shaft 3, the first motor generator 4, the second motor generator 5, and the driving shaft 7 and transmits power and receives power to and from the output shaft 3 of the internal combustion engine 2, the first motor generator 4, the second motor generator 5, and the driving shaft 7. Accordingly, the drive control device 1 employs the control form of the "four-axis type".

The hybrid vehicle 1 connects the air content adjusting means 9, the fuel supplying means 10, the ignition means 11, the first inverter 18, and the second inverter 19 to the drive control unit 38. In addition, an accelerator opening degree detecting means 39, a vehicle speed detecting means 40, an engine rotation speed detecting means 41, and a battery charge state detecting means 42 are connected to the drive control unit 38.

The accelerator opening degree detecting means 39 detects the accelerator opening degree that is the amount of pressing the accelerator pedal using a foot. The vehicle speed detecting means 40 detects a vehicle speed (car speed) of the hybrid vehicle. The engine rotation number detecting means 41 detects the engine rotation speed of the internal combustion engine 2. The battery charge state detecting means 42 detects the charge state SOC of the battery 20.

In addition, the drive control unit 38 includes: a target driving force setting means 43; a target driving power setting means 44; a target charge/discharge power setting means 45; a target engine power calculating means 46; a target engine operating point setting means 47; a motor torque instruction value calculating means 48; and a delaying means 49.

Figure 2:
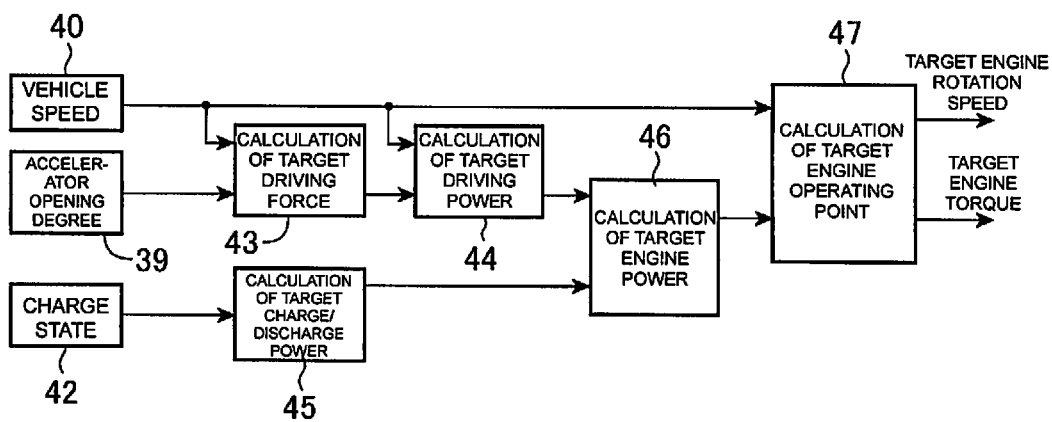
FIG. 2 is a control block diagram of a target engine operating point.
Figure 6:
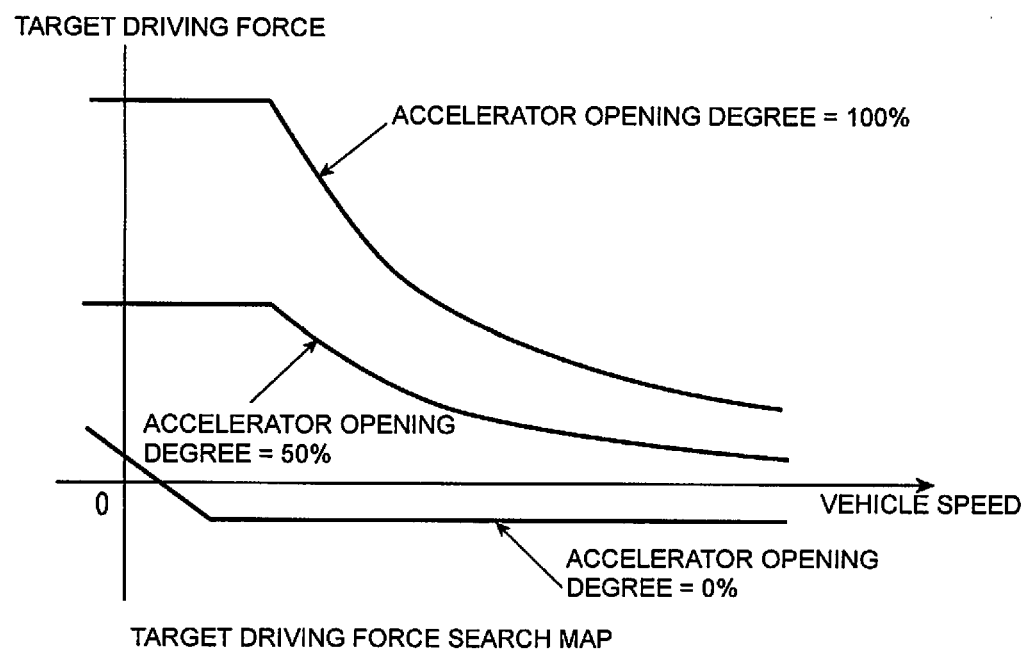
FIG. 6 is a target driving force search map according to a vehicle speed and the accelerator opening degree.

The target driving force setting means 43, as illustrated in FIG. 2, searches a target driving force search map illustrated in FIG. 6 for the target driving force used for driving the hybrid vehicle in accordance with the accelerator opening degree detected by the accelerator opening degree detecting means 39 and the vehicle speed detected by the vehicle speed detecting means 40 and determines the target driving force. The target driving force is set to a negative value so as to be a driving force in a deceleration direction corresponding to engine brake in a high vehicle speed region at the accelerator opening degree=0 and is set to a positive value for creep driving in a low vehicle speed region.

The target driving power setting means 44 sets target driving power based on the accelerator opening degree detected by the accelerator opening degree detecting means 39 and the vehicle speed detected by the vehicle speed detecting means 40. In this embodiment, as illustrated in FIG. 2, target driving power required for driving the hybrid vehicle at the target driving force is set by multiplying the target driving force set by the target driving force setting means 43 by the vehicle speed detected by the vehicle speed detecting means 40.

The target charge/discharge power setting means 45 sets target charge/discharge power based on at least the charge state SOC of the battery 20 that is detected by the battery charge state detecting means 42. In this embodiment, target charge/discharge power is searched from a target charge/discharge power search table illustrated in FIG. 7 in accordance with the charge state SOC of the battery 20 and the vehicle speed and is set. The target charge/discharge power is set such that the absolute value thereof decreases as the vehicle speed is lowered.

The target engine power calculating means 46, as illustrated in FIG. 2, calculates target engine power based on the target driving power set by the target driving power setting means 44 and the target charge/discharge power set by the target charge/discharge power setting means 45. In this embodiment, by subtracting the target charge/discharge power from the target driving power, the target engine power is acquired.

The target engine operating point setting means 47 sets a target engine operating point (a target engine rotation speed and target engine torque) based on the target engine power and the efficiency of the whole system of the drive control device 1. In this embodiment, the target engine operating point is searched from a target engine operating point search map illustrated in FIG. 8 in consideration of the vehicle speed.

The motor torque instruction value calculating means 48 calculates torque instruction values of the first and second motor generators 4 and 5.

The delaying means 49 delays the target engine torque applied to the motor torque instruction value calculating means 48.

Figure 3:
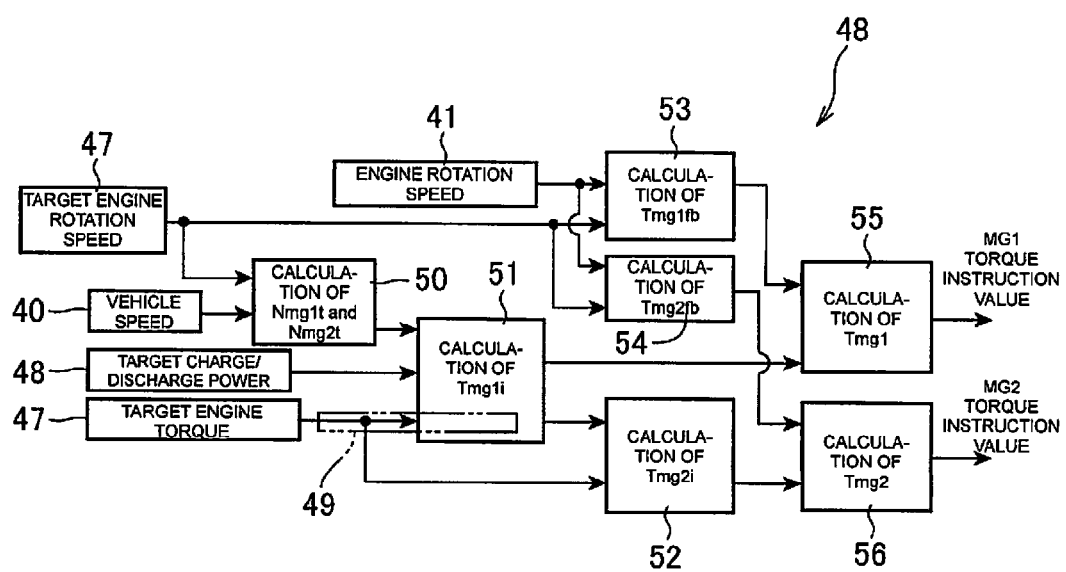
FIG. 3 is a control block diagram of calculating a torque instruction value of a motor generator.

The torque instruction value of the first motor generator 4 and the torque instruction value of the second motor generator 5 set by the motor torque instruction value calculating means 48, as illustrated in FIG. 3, are calculated by first to seventh calculation units 50 to 56. In FIG. 3, MG1 represents the first motor generator 4, and MG2 represents the second motor generator 5.

The first calculation unit 50 calculates a target rotation speed Nmg1t of the first motor generator 4 and a target rotation speed Nmg2t of the second motor generator 5 in a case where the engine rotation speed is the target engine rotation speed based on the target engine rotation speed set by the target engine operating point setting means 47 and the vehicle speed detected by the vehicle speed detecting means 40.

The second calculation unit 51 calculates basic torque Tmg1i of the first motor generator 4 based on the target rotation speed Nmg1t of the first motor generator 4 and the target rotation speed Nmg2t of the second motor generator 5, which are calculated by the first calculation unit 50, the target charge/discharge power set by the target charge/discharge power setting means 45, and the target engine torque set by the target engine operating point setting means 47.

The third calculation unit 52 calculates basic torque Tmg2i of the second motor generator 5 based on the basic torque Tmg1i of the first motor generator 4 that is calculated by the second calculation unit 51 and the target engine torque set by the target engine operating point setting means 47.

The fourth calculation unit 53 calculates feedback correction torque Tmg1fb of the first motor generator 4 based on the engine rotation speed detected by the engine rotation speed detecting means 41 and the target engine rotation speed set by the target engine operating point setting means 47.

The fifth calculation unit 54 calculates feedback correction torque Tmg1fb of the second motor generator 5 based on the engine rotation speed detected by the engine rotation speed detecting means 41 and the target engine rotation speed set by the target engine operating point setting means 47.

The sixth calculation unit 55 calculates a torque instruction value Tmg1 of the first motor generator 4 based on the basic torque Tmg1i of the first motor generator 4 that is calculated by the second calculation unit 51 and the feedback correction torque Tmg1fb of the first motor generator 4 that is calculated by the fourth calculation unit 53.

The seventh calculation unit 56 calculates a torque instruction value Tmg2 of the second motor generator 5 based on the basic torque Tmg2i of the second motor generator 5 that is calculated by the third calculation unit 52 and the feedback correction torque Tmg2fb of the second motor generator 5 that is calculated by the fifth calculation unit 54.

The drive control device 1 of the hybrid vehicle performs control of the drive states of the air content adjusting means 9, the fuel supplying means 10, and the ignition means 11 such that the internal combustion engine 2 operates at the target engine operating point (the target engine rotation speed and the target engine torque) set by the target engine operating point setting means 47 by using the drive control unit 38. In addition, the drive control unit 38 performs control of the drive states of the first and second motor generators 4 and 5 using the torque instruction values set by the motor torque instruction value calculating means 48 such that the engine rotation speed of the internal combustion engine 2 is the target engine rotation speed set by the target engine operating point setting means 47.

Figure 4:
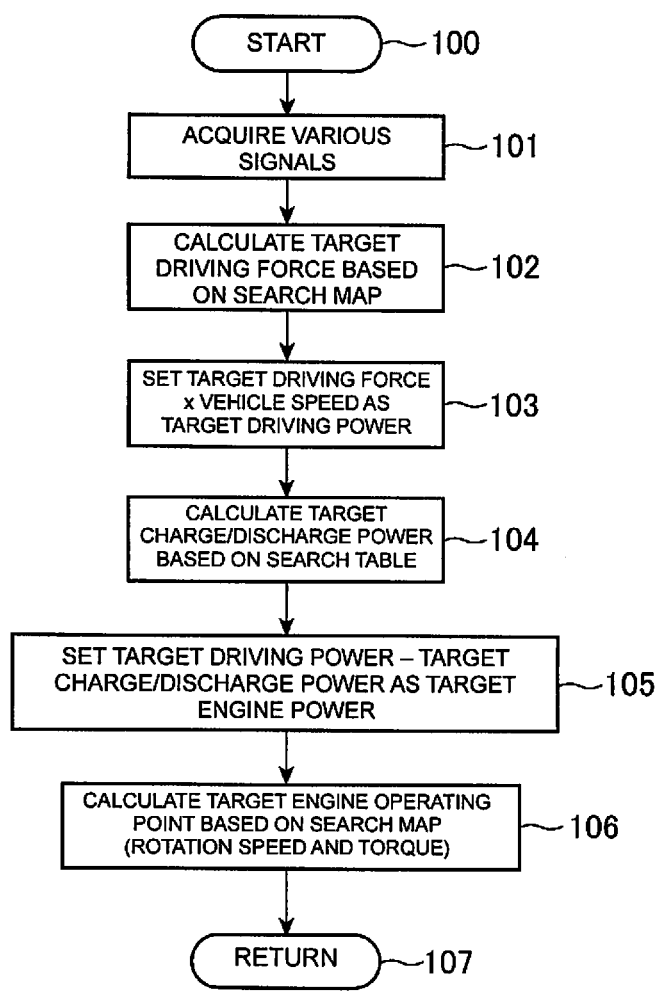
FIG. 4 is a control flowchart of calculating a target engine operating point.
Figure 5:
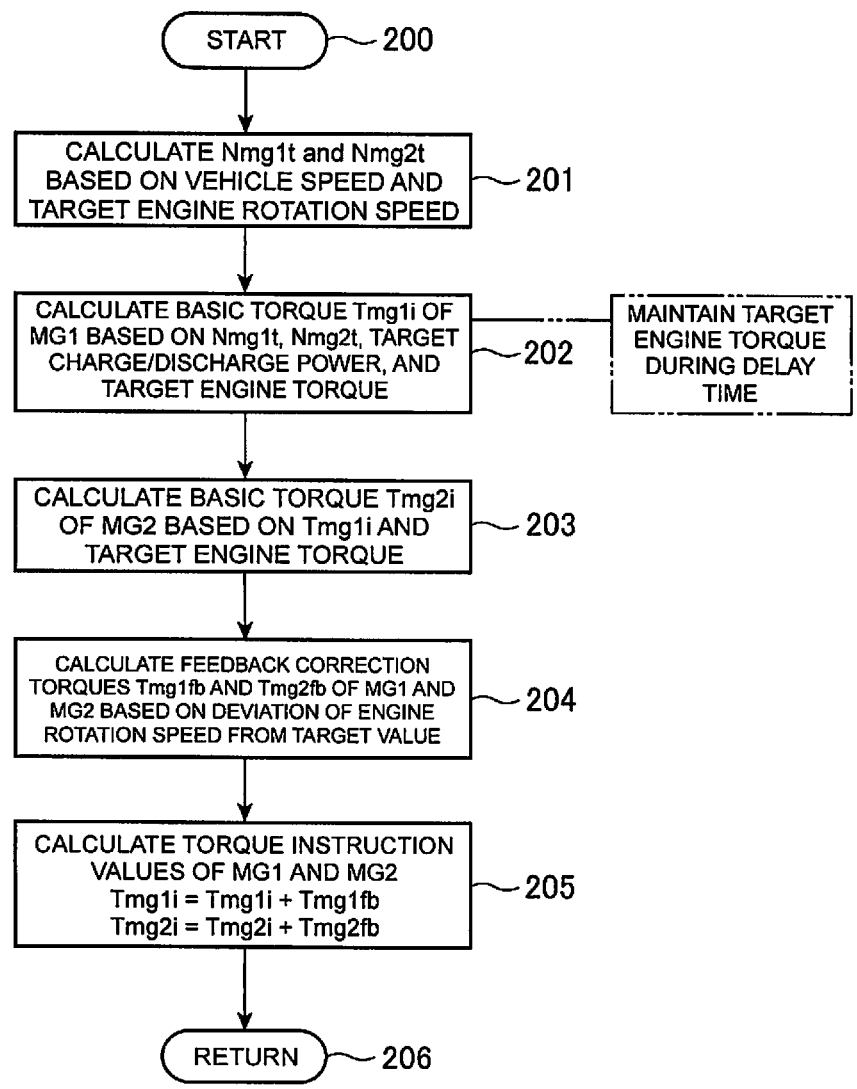
FIG. 5 is a control flowchart of calculating a torque instruction value of a motor generator.

The drive control device 1 of the hybrid vehicle, as illustrated in the flowchart of controlling the calculation of the target engine operating point represented in FIG. 4, calculates a target engine operating point (the target engine rotation speed and the target engine torque) based on the amount of driver's operation of the accelerator and the vehicle speed and, as illustrated in the flowchart of controlling the calculation of the motor torque instruction value represented in FIG. 5, calculates torque instruction values of the first and second motor generators 4 and 5 based on the target engine operating point.

In the calculation of the target engine operating point, as illustrated in FIG. 4, when the control program starts (100), various signals of the accelerator opening degree detected by the accelerator opening degree detecting means 39, the vehicle speed detected by the vehicle speed detecting means 40, the engine rotation speed detected by the engine rotation speed detecting means 41, and the charge state SOC of the battery 20 detected by the battery charge state detecting means 42 are acquired (101) and a target driving force is calculated based on the target driving force detection map (see FIG. 6) (102).

The target driving force is set to a negative value so as to be a driving force in a deceleration direction corresponding to engine brake in a high vehicle speed region at the accelerator opening degree=0 and is set to a positive value for creep driving in a low vehicle speed region.

Next, target driving power required for driving the hybrid vehicle with the target driving force is calculated by multiplying the target driving force calculated in Step 102 by the vehicle speed (103) and target charge/discharge power is calculated based on the target charge/discharge power search table (see FIG. 7) (104).

Figure 7:
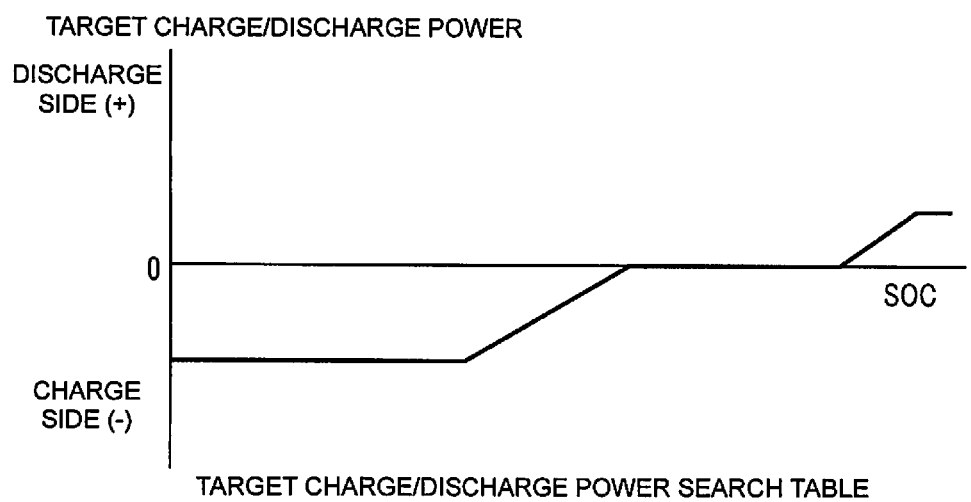
FIG. 7 is a target charge/discharge power search table according to the charge state of a battery.

In Step 104, in order to control the charge state SOC of the battery 20 in a normal use range, a target charge/discharge amount is calculated based on the target charge/discharge power search table illustrated in FIG. 7. In a case where the charge state SOC of the battery 20 is low, the target charge/discharge power is increased on the charge side so as to prevent excessive discharge of the battery 20. In a case where the charge state SOC of the battery 20 is high, the target charge/discharge power is increased on the discharge side so as to prevent excessive charge. The target charge/discharge power, for the convenience of description, the discharge side is set as a positive value, and the charge side is set as a negative value.

In addition, target engine power to be output by the internal combustion engine 2 is calculated based on the target driving power and the target charge/discharge power (105). The power to be output by the internal combustion engine 2 has a value acquired by adding (subtracting in the case of discharge) the power required for charging the battery 20 to the power required for driving the hybrid vehicle. Here, since the charge side is handled as a negative value, the target engine power is calculated by subtracting the target charge/discharge power from the target driving power.

Figure 8:
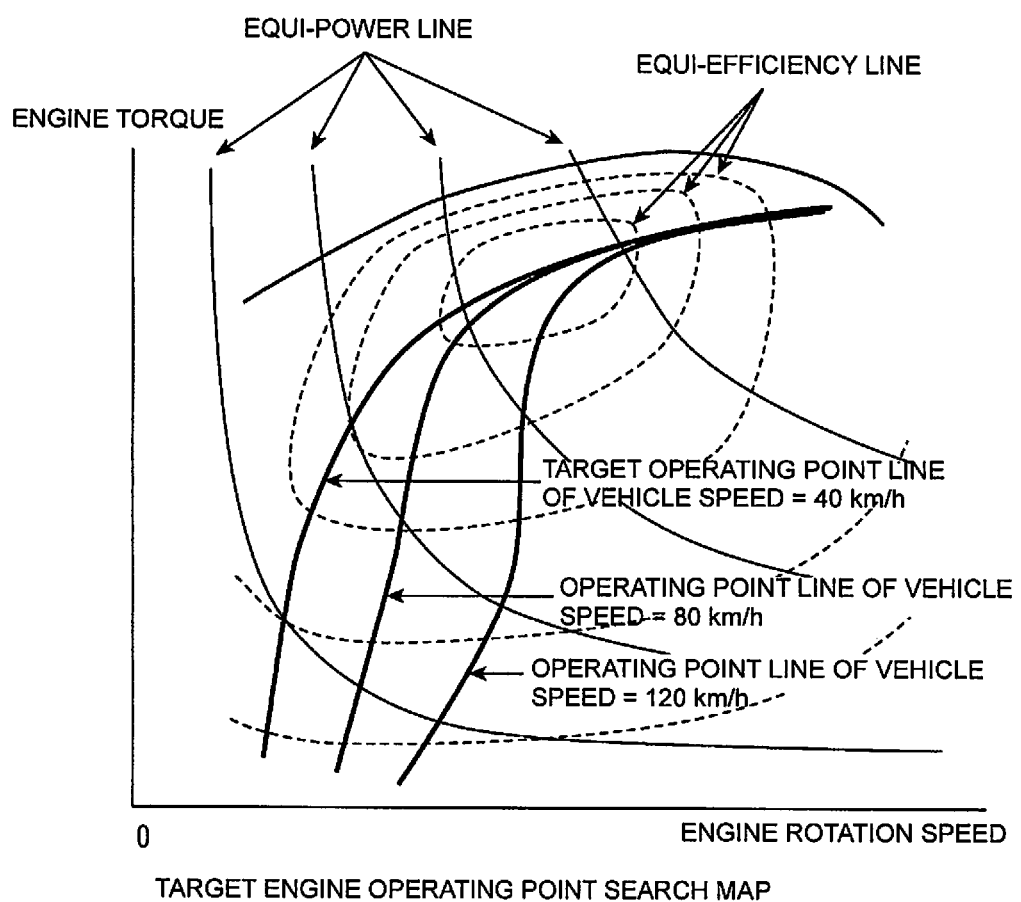
FIG. 8 is a target engine operating point search map according to engine torque and an engine rotation speed.

Next, a target engine operating point (the target engine rotation speed and the target engine torque) corresponding to the vehicle speed is calculated based on the target engine operating point search map illustrated in FIG. 8 (106), and the process returns (107).

The target engine operating point search map (FIG. 8) selects points at which the total efficiency acquired by adding the efficiency of the power transmission system configured by the differential gear mechanism 8 and the first and second motor generators 4 and 5 to the efficiency of the internal combustion engine 2 is high on the equi-power line for each power level and sets a line acquired by joining the points as a target engine operating point line. Each target engine operating point line is set for each vehicle speed (40 km/h, 80 km/h, and 120 km/h in FIG. 8). The set value of the target engine operating point line may be acquired through an experiment or may be acquired through a calculation that is based on the efficiency of the internal combustion engine 2 and the first and second motor generators 4 and 5. In addition, the target engine operating point line is set to move to the high rotation side as the vehicle speed increases.

The reason for this is as follows.

Figure 9:
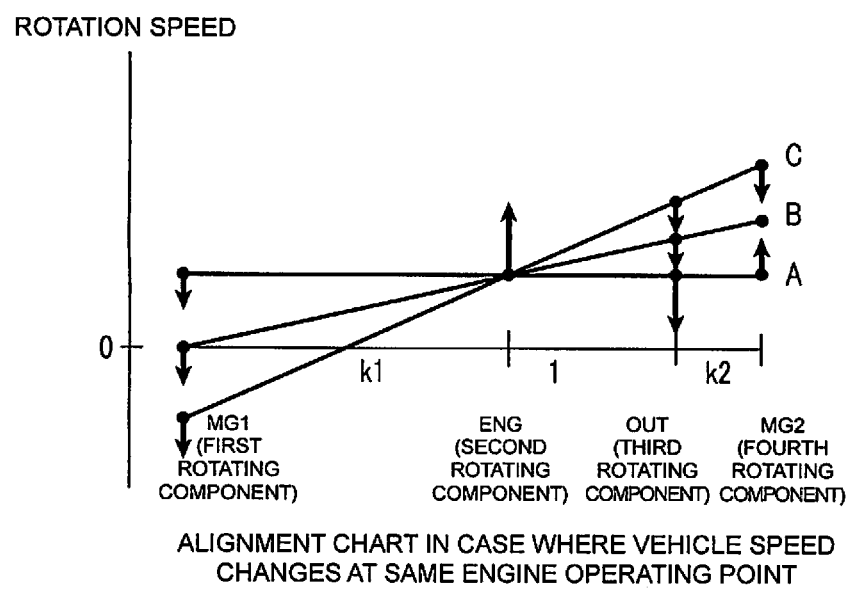
FIG. 9 is an alignment chart in a case where the vehicle speed is changed at the same engine operating point.

In a case where the same engine operating point is set as the target engine operating point regardless of the vehicle speed, as illustrated in FIG. 9, the rotation speed of the first motor generator 4 is positive in a case where the vehicle speed is low, and the first motor generator 4 serves as a power generator, and the second motor generator 5 serves as an electric motor (A). Then, as the vehicle speed increases, the rotation speed of the first motor generator 4 approaches zero (B), and, when the vehicle speed further increases, the rotation speed of the first motor generator 4 becomes negative. In this state, the first motor generator 4 operates as an electric motor, and the second motor generator 5 operates as a power generator (C).

In a case where the vehicle speed is low (states A and B), since the circulation of the power does not occur, and the target engine operating point, like the target engine operating point line of the vehicle speed=40 km/h illustrated in FIG. 8, is close to a point at which the efficiency of the internal combustion engine 2 is high on the whole.

However, in a case where the vehicle speed is high (state C), the first motor generator 4 operates as an electric motor, the second motor generator 5 operates as a power generator, and accordingly, the circulation of the power occurs, whereby the efficiency of the power transmission system is lowered. Accordingly, as illustrated at a point C illustrated in FIG. 11, the efficiency of the power transmission system is lowered even when the efficiency of the internal combustion engine 2 is high, and accordingly, the total efficiency is lowered.

Figure 11:
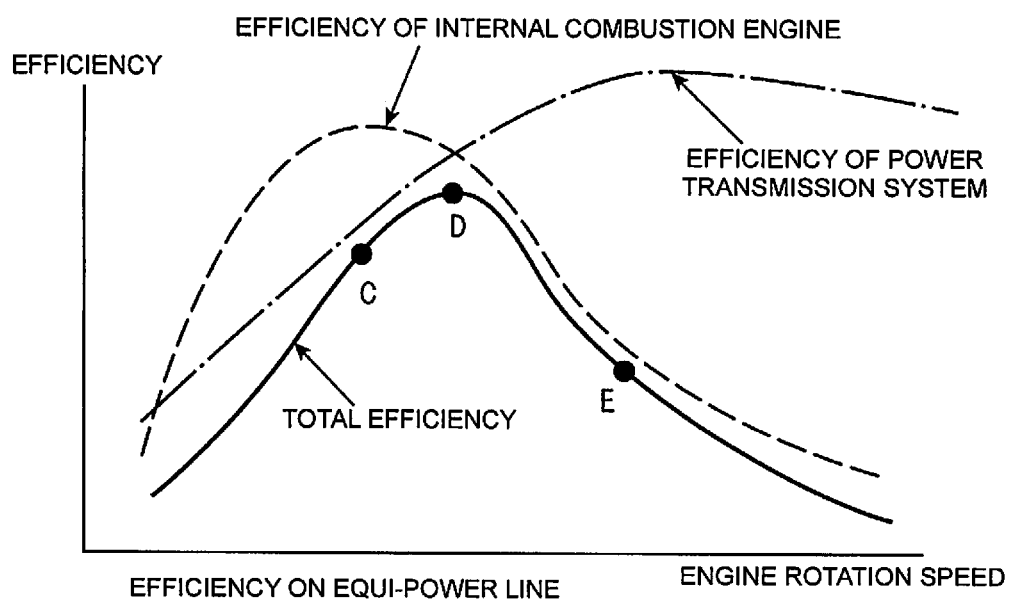
FIG. 11 is a diagram that illustrates the efficiency on a power line formed by efficiency and an engine rotation speed.
Figure 12:
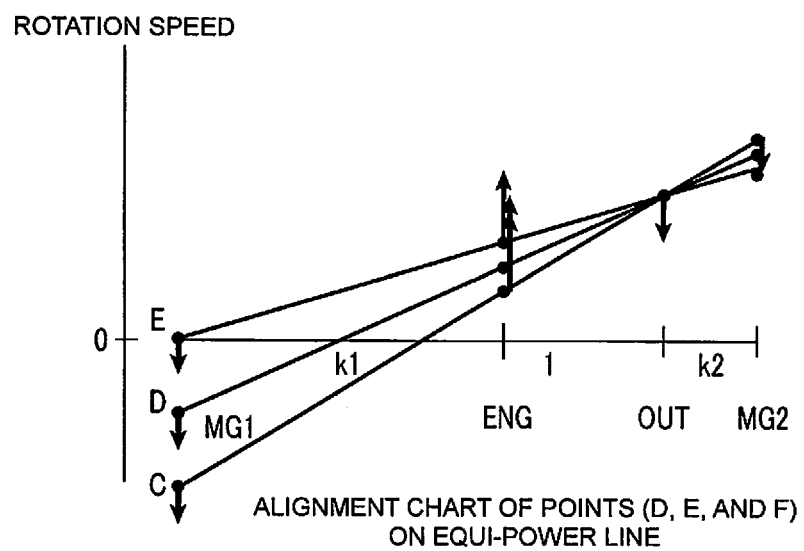
FIG. 12 is an alignment chart of points (D, E, and F) on an equi-power line.

Thus, in order not to cause the circulation of power to occur in the high vehicle speed region, like E in the alignment chart illustrated in FIG. 12, the rotation speed of the first motor generator 4 may be set to zero or higher. However, in such a case, the engine operating point of the internal combustion engine 2 moves in a direction in which the engine rotation speed of the internal combustion engine 2 increases. Thus, as illustrated at a point E illustrated in FIG. 11, even when the efficiency of the power transmission system is high, the efficiency of the internal combustion engine 2 is lowered much, whereby the total efficiency is lowered.

Accordingly, as illustrated in FIG. 11, a point at which the total efficiency is high is D therebetween, and, by setting this point as the target engine operating point, an operation having the highest efficiency can be performed.

Figure 10:
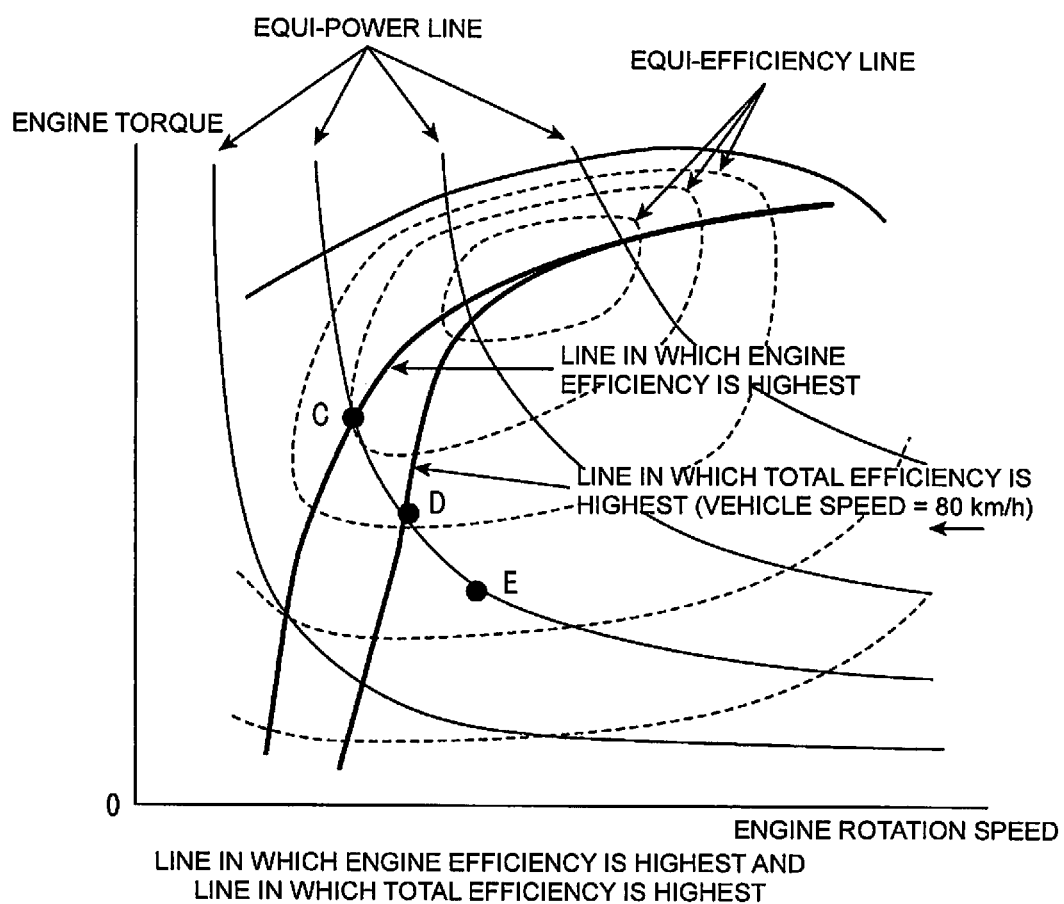
FIG. 10 is a diagram that illustrates a line of the highest engine efficiency and a line of the highest total efficiency in a target engine operating point search map formed by engine torque and an engine rotation speed.

As above, in FIG. 10, three engine operating points C, D, and E are represented on the target engine operating point search map. It can be understood that an operating point at which the total efficiency is the highest moves to a further high rotation side than an operating point at which the engine efficiency is the highest in a case where the vehicle speed is high.

Next, the calculation of torque instruction values that are the target torque of the first motor generator 4 and the target torque of the second motor generator 5 used for setting the amount of charge/discharge of the battery 20 as a target value while the target driving force is output will be described along the flowchart of controlling the calculation of the motor torque instruction values illustrated in FIG. 5. In FIG. 5, MG1 represents the first motor generator 4, and MG2 represents the second motor generator 5.

In the calculation of the motor torque instruction values, as illustrated in FIG. 5, when a control program starts (200), first, in Step 201, the driving shaft rotation speed No of the driving shaft 7 to which the first and second planetary gear mechanisms 21 and 22 are connected is calculated based on the vehicle speed. Next, the target rotation speed Nmg1$t$ of the first motor generator 4 and the target rotation speed Nmg2$t$ of the second motor generator 5 in a case where the engine rotation speed Ne is the target engine rotation speed Net set by the target engine operating point setting means 47 are calculated by using the following Equations (1) and (2). These Equations (1) and (2) for the calculation are acquired based on the relation between the rotation speeds of the first and second planetary gear mechanisms 21 and 22.

$$Nmg1t=(Net-No)*k1+Net \qquad \text{Equation (1)}$$

$$Nmg2t=(No-Net)*k2+No \qquad \text{Equation (1)}$$

Here, k1 and k2, as will be described later, are values that are determined based on the gear ratio between the first and second planetary gear mechanisms 21 and 22.

Next, in Step 202, basic torque Tmg1$i$ of the first motor generator 4 is calculated by using the following Equation (3) based on the target rotation speed Nmg1$t$ of the first motor generator 4 and the target rotation speed Nmg2$t$ of the second motor generator 5, which have been acquired in Step 201, and the target charge/discharge power Pbatt set by the target charge/discharge power setting means 45 and the target engine torque Tet set by the target engine operating point setting means 47.

$$Tmg1i=(P\text{batt}*60/2\pi-Nmg2t*Tet/k2)/(Nmg1t+Nmg2t*(1+k1)/k2) \qquad \text{Equation (3)}$$

This Equation (3) for the calculation can be derived by solving certain simultaneous equations from a torque balance equation (4) representing the balance of torques input to the first and second planetary gear mechanisms 21 and 22 and an electric power balance equation (5) representing that the electric power generated or consumed by the first and second motor generators 4 and 5 and the input/output electric power for the battery 20 are the same.

$$Te+(1+k1)*Tmg1=k2*Tmg2 \qquad \text{Equation (4)}$$

$$Nmg1*Tmg1*2n/60+Nmg2*Tmg2*2\pi/60=P\text{batt} \qquad \text{Equation (5)}$$

Next, in Step 203, the basic torque Tmg2$i$ of the second motor generator 5 is calculated by using the following Equation (6) based on the basic torque Tmg1i of the first motor generator 4 and the target engine torque Tet.

$$Tmg2i=(Te+(1+k1)*Tmg1i)/k2 \qquad \text{Equation (6)}$$

This equation is derived from Equation (4) described above.

Next, in Step 204, in order to make the engine rotation speed approach the target, the feedback correction torque Tmg1$fb$ of the first motor generator 4 and the feedback correction torque Tmg2$fb$ of the second motor generator 5 are calculated by multiplying the deviation of the engine rotation speed Ne from the target engine rotation speed Net by a predetermined feedback gain set in advance.

In Step 205, torque instruction values Tmg1 and Tmg2 that are control instruction values of the first and second motor generators 4 and 5 are calculated by adding the feedback correction torques Tmg1$fb$ and Tmg2$fb$ of the first and second motor generators 4 and 5 to the basic torques Tmg1$i$ and Tmg2$i$, and the process returns (206).

The drive control unit 38 controls the first and second motor generators 4 and 5 in accordance with the torque instruction values Tmg1 and Tmg2, whereby the amount of charge/discharge for the battery 20 can be the target value while the target driving force is output even when the engine torque changes in accordance with an external disturbance.

FIGS. 13 to 16 illustrate alignment charts in representative operation states. In the alignment charts, four rotating components 34 to 37 of the differential gear mechanism 8 formed by the first and second planetary gear mechanisms 21 and 22 are aligned in order of the first rotating component 34 connected to the first motor generator 4 (MG1), the second rotating component 35 connected to the internal combustion engine 2 (ENG), the third rotating component 36 connected to the driving shaft 7 (OUT), and the fourth rotating component 37 connected to the second motor generator 5 (MG2) in the alignment chart, and the mutual lever ratio among the rotating components 34 to 37 is arranged to be k1:1:k2 in the same order.

Here, values k1 and k2 determined based on the gear ratio of the differential gear mechanism 8 formed by the first and second planetary gear mechanisms 21 and 22 are defined as below.

$$k1 = ZR1/ZS1$$

$$k2 = ZS2/ZR2$$

ZS1: the number of teeth of first sun gear
ZR1: the number of teeth of first ring gear
ZS2: the number of teeth of second sun gear
ZR2: the number of teeth of second ring gear Next, the operation states will be described using an alignment chart. In the rotation speed, the rotation direction of the output shaft 3 of the internal combustion engine 2 is set as a positive direction. In addition, in the torque that is input/output to/from each shaft, a direction in which torque having the same direction as that of the torque of the output shaft 3 of the internal combustion engine 2 is input is defined as positive. Accordingly, in a case where the torque of the driving shaft 7 is positive, a state is formed in which torque for driving the hybrid vehicle to the rear side is output (deceleration at the time of forward driving and driving at the time of backward driving). On the other hand, in a case where the torque of the driving shaft 7 is negative, a state is formed in which torque for driving the hybrid vehicle to the front side is output (driving at the time of forward driving, and deceleration at the time of backward driving).

In a case where power generation or backward driving (acceleration by transmitting power to the drive wheel 7 or maintaining a balanced speed on an ascending slope) is performed by the first and second motor generators 4 and 5, there are losses due to heat generation in the first and second inverters 18 and 19 and the first and second motor generators 4 and 5, and accordingly, the efficiency is not 100% in a case where a conversion between electrical energy and mechanical energy is made. However, for the simplification of description, it is assumed that there is no loss. In a case where the loss is considered for practical implementation, power generation is controlled so as to additionally generate power corresponding to the energy consumed due to the loss.

Figure 13:
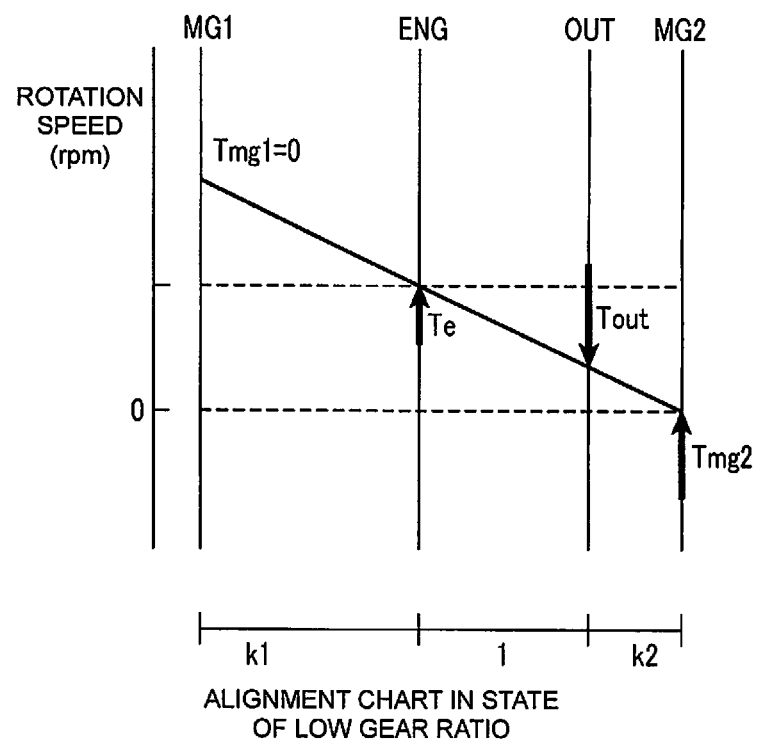
FIG. 13 is an alignment chart of the state of a low gear ratio.

(1) Low Gear Ratio State (FIG. 13)

Driving is performed using the internal combustion engine 2, and a state is formed in which the rotation speed of the second motor generator 5 is zero. The alignment chart at this time is illustrated in FIG. 13. Since the rotation speed of the second motor generator 5 is zero, no power is consumed. Thus, in a case where there is no charge/discharge of the battery 20, power generation using the first motor generator 4 does not need to be performed, and the torque instruction value Tmg1 of the first motor generator 4 is zero.

In addition, the ratio between the engine rotation speed of the output shaft 3 and the driving shaft rotation speed of the driving shaft 7 is $(1+k2)/k2$.

Figure 14:
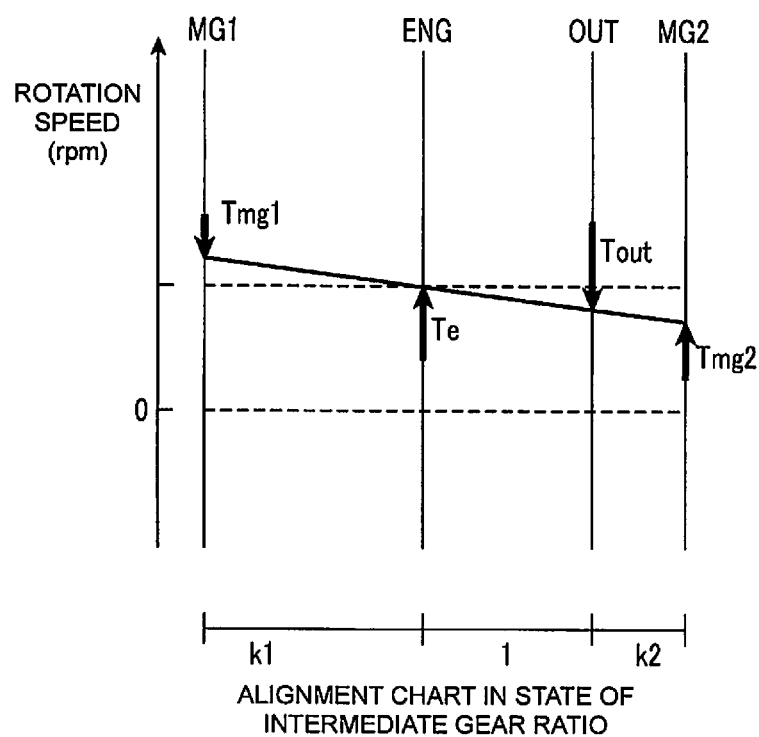
FIG. 14 is an alignment chart of the state of an intermediate gear ratio.

(2) Intermediate Gear Ratio State (FIG. 14)

Driving is performed using the internal combustion engine 2, and a state is formed in which the rotation speeds of the first and second motor generators 4 and 5 are positive. The alignment chart at this time is illustrated in FIG. 14. In this case, in a case where there is no charge/discharge of the battery 20, the first motor generator 4 is regenerated, and the second motor generator 5 is reversely operated using the regenerated electric power.

Figure 15:
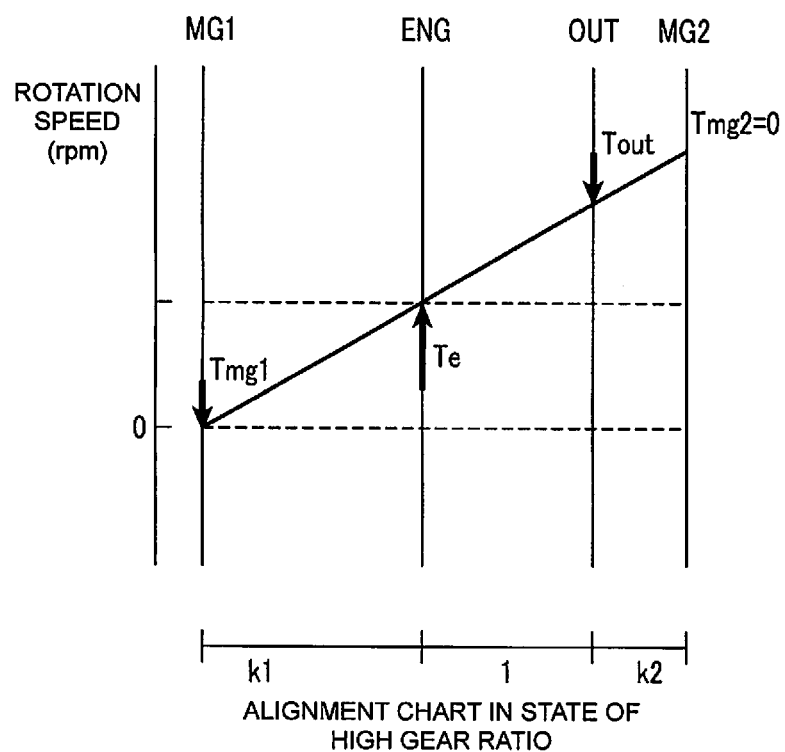
FIG. 15 is an alignment chart of the state of a high gear ratio.

(3) High Gear Ratio State (FIG. 15)

Driving is performed using the internal combustion engine 2, and a state is formed in which the rotation speed of the first motor generator 4 is zero. The alignment chart at this time is illustrated in FIG. 15. Since the rotation speed of the first motor generator 4 is zero, regeneration is not performed. Accordingly, in a case where there is no charge/discharge of the battery 20, the reverse operation or the regeneration is not performed by the second motor generator 5, and the torque instruction value Tmg2 of the second motor generator 5 is zero.

In addition, the ratio between the engine rotation speed of the output shaft 3 and the driving shaft rotation speed of the driving shaft 7 is $k1/(1+k1)$.

Figure 16:
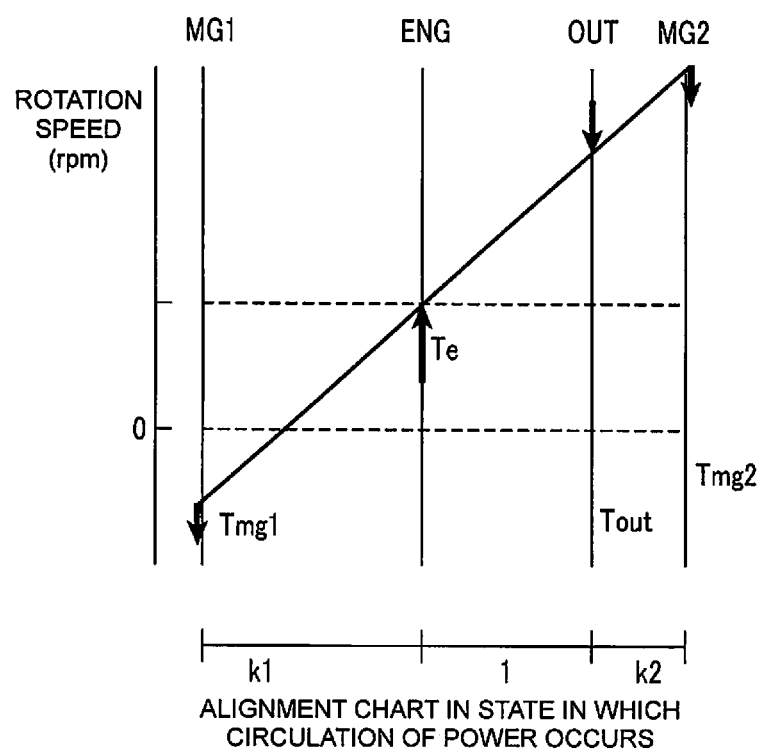
FIG. 16 is an alignment chart of the state in which power circulation occurs.

(4) State in Which Power Circulation is Performed (FIG. 16)

In a state in which the vehicle speed is higher than the high gear ratio state, a state is formed in which the first motor generator 4 is reversely rotated. In this state, the first motor generator 4 is reversely operated, thereby consuming the electric power. Accordingly, in a case where there is no charge/discharge of the battery 20, the second motor generator 5 is regenerated and performs power generation.

The drive control device 1 of the hybrid vehicle includes the delaying means 49 that delays the target engine torque applied to the motor torque instruction value calculating means 48.

The drive control device 1 acquires torque requested from the driver based on the accelerator opening degree and calculates and distributes the target engine torque of the internal combustion engine 2 and torque instruction values that are target motor torques of the first and second motor generators 4 and 5. Since engine torque to be generated is determined in advance at the time of the suction stroke, the compression stroke, and the expansion stroke of the internal combustion engine 2, in order to allow the engine torque to follow the target engine torque, a delay occurs. In addition, since the engine torque of the internal combustion engine 2 is controlled by adjusting the degree of opening of the throttle, a suction delay occurs inside the cylinder due to the length of the inlet system, and accordingly, the follow-up to the target engine torque is further delayed.

In other words, in a transient response of an internal combustion engine, even when a throttle valve is controlled to be open or closed based on the request from the driver, there is a response delay due to a suction delay caused by the length of a suction pipe up to each cylinder of the internal combustion engine and a combustion stroke delay of the internal combustion engine from a suction stroke in which fuel enters the cylinder to an expansion stroke in which the combustion of the fuel occurs.

In a case where the requested torque for the internal combustion engine 2 rapidly decreases in a state in which a follow-up delay toward the target engine torque is not considered, while the motor torque can be controlled so as to rapidly decrease, as illustrated in FIG. 19(A), the engine torque is in the state of continuously generating torque due to the follow-up delay, and, as illustrated in FIG. 19(B), the engine rotation speed rapidly increases (blow up), or the torque balance is disturbed, whereby the drivability may become unsmooth.

Thus, the drive control device 1 of the hybrid vehicle, as illustrated in FIG. 1, determines a decrease in the requested torque based on the accelerator opening degree detected by the accelerator opening degree detecting means 39 and includes the delaying means 49 that delays the target engine torque applied to the motor torque instruction value calculating means 48 in a case where the decrease in the requested torque is determined.

The delaying means 49 sets a delay time for performing the delaying operation and changes the delay time in accordance with the target engine rotation speed set by the target engine operating point setting means 47. The delaying means 49 changes the delay time to decrease in a case where the target engine rotation speed is high and changes the delay time to increase in a case where the target engine rotation speed is low.

Figure 17:
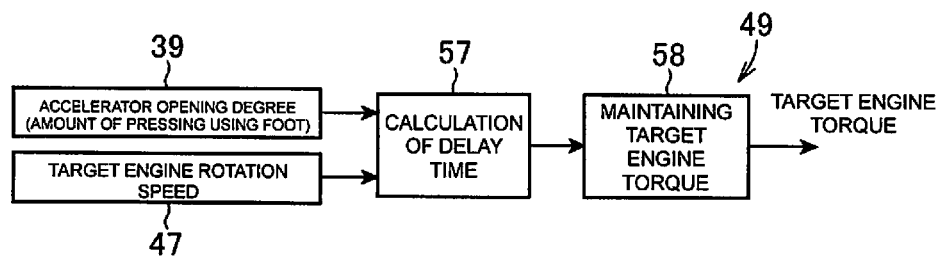
FIG. 17 is a control block diagram of calculating a delay time of the target engine torque.

The delaying means 49, as illustrated in FIG. 17, includes a delay time calculating unit 57 and a target engine torque maintaining unit 58. The delay time calculating unit 57 calculates a delay time used for delaying the target engine torque based on the accelerator opening degree detected by the accelerator opening degree detecting means 39 and the target engine rotation speed set by the target engine operating point setting means 47. The target engine torque maintaining unit 58 maintains the target engine torque only for the delay time calculated by the delay time calculating unit 57 and delays the output of the target engine torque.

The delaying means 49, as denoted by a dashed-two dotted line in FIG. 3, is arranged at a previous stage of the second calculation unit 51 of the motor torque instruction value calculating means 48 or inside the second calculation unit 51. The delaying means 49, as denoted by a dashed-two dotted line in FIG. 5, maintains the target engine torque used for calculating the basic torque of the first motor generator 4 in Step 202 only for the delay time.

Figure 18:
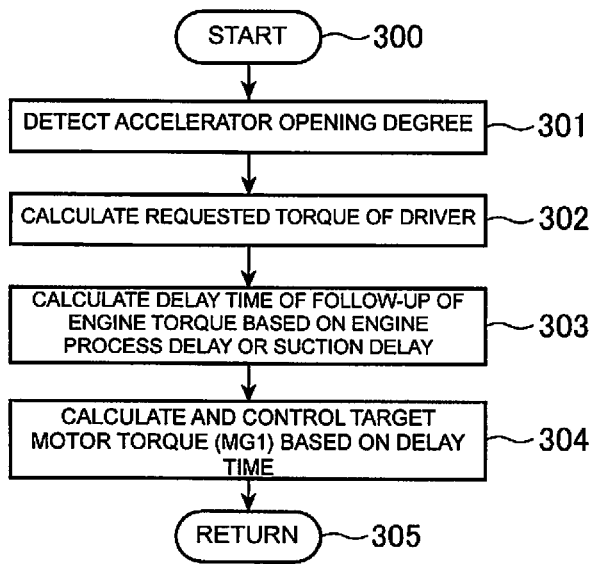
FIG. 18 is a control flowchart of calculating target motor torque according to a delay time.
Figure 19:
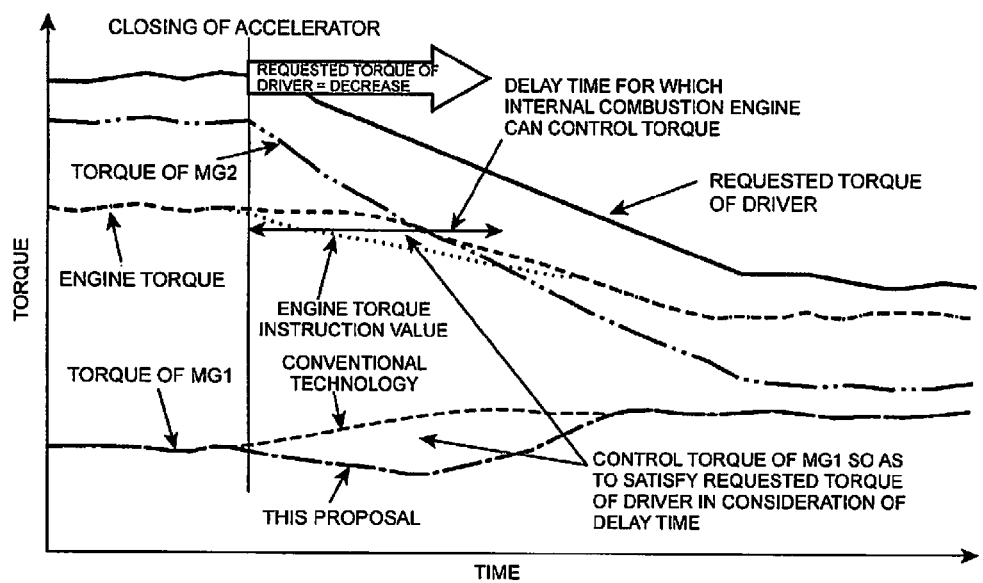
FIG. 19(A) is a time chart of torque.
FIG. 19(B) is a time chart of a rotation speed.
Figure 19:
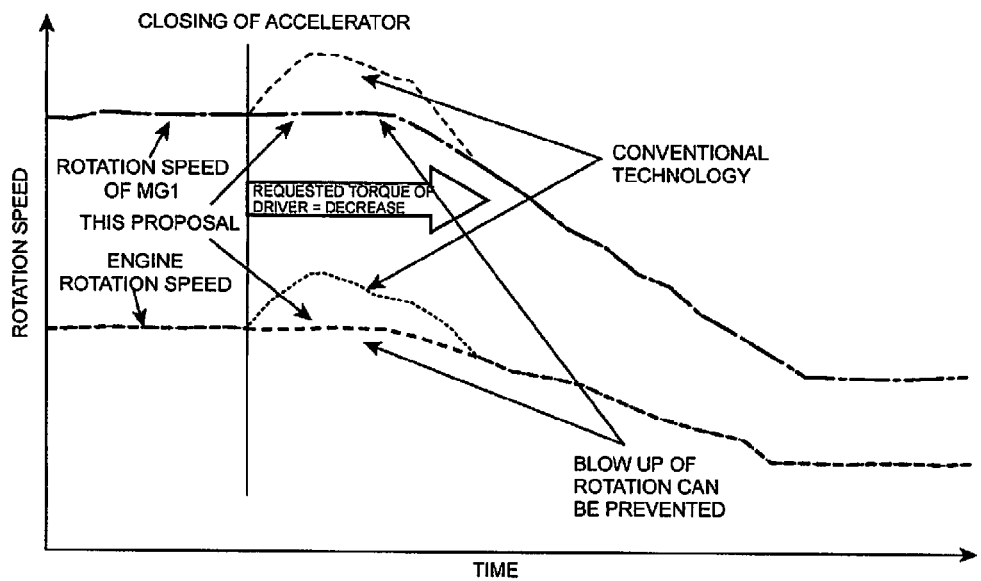

The drive control device 1 of the hybrid vehicle, as illustrated in FIGS. 18 and 19, sets a delay time used for delaying the target engine torque and calculates target engine torque according to the delay time. In FIGS. 18 and 19, MG1 represents the first motor generator 4, and MG2 represents the second motor generator 5.

As illustrated in FIG. 18, in the calculating the target engine torque according to the delay time, when a control program starts (300) as illustrated in FIG. 18, the drive control device 1 detects the accelerator opening degree used for control using the accelerator opening degree detecting means 39 (301). In a time chart illustrated in FIG. 19, the closing of the accelerator (a state in which the accelerator pedal returns) of the driver is detected.

In Step 302, the requested torque of the driver is calculated based on the accelerator opening degree. In the time chart illustrated in FIG. 19, a torque-down request is calculated in accordance with the closing of the accelerator.

In Step 303, a follow-up delay time of the engine torque is calculated based on the stroke delay of the internal combustion engine 2 and the suction delay of the internal combustion engine 2. In the time chart illustrated in FIG. 19, a predetermined amount of the delay time is calculated.

In Step 304, target motor torque of the first motor generator 4 is calculated with a delay based on the delay time calculated in Step 303 and the calculated target motor torque is used for the control of the torque of the first motor generator 4. In the time chart illustrated in FIG. 19, during the delay time, the engine torque is determined, and accordingly, in order to satisfy the requested torque of the driver in the motor torque of the first motor generator 4, the motor-generated torque of the first motor generator 4 is decreased (negative torque is increased).

The drive control device 38 performs control by arranging a delay time in consideration of the follow-up delay toward the target engine torque using the delaying means 48 and calculating target motor torque, and accordingly, the control of the engine rotation is stabilized, and the drivability is stabilized. The drive control device 38 calculates motor torque based on a value acquired by applying a delay to the target engine torque and controls the first and second motor generators 4 and 5.

As above, the drive control device 1 of the hybrid vehicle includes: the target driving force setting means 43 that sets the target driving force based on the accelerator opening degree and the vehicle speed; the target driving power setting means 44 that sets the target driving power based on the vehicle speed and the target driving force; the target charge/discharge power setting means 45 that sets target charge/discharge power based on at least the charge state of the battery 20; the target engine power calculating means 46 that calculates target engine power based on the target driving power and the target charge/discharge power; the target engine operating point setting means 47 that sets a target engine operating point based on the target engine power and the total system efficiency; and the motor torque instruction value calculating means 48 that sets the torque instruction values of the first and second motor generators 4 and 5. The motor torque instruction value calculating means 49 calculates the torque instruction values of a plurality of the first and second motor generators 4 and 5 using the torque balance equation including the target engine torque required at the target engine operating point and the electric power balance equation including the target charge/discharge power.

When feedback correction is performed, the motor torque instruction value calculating means 48 calculates the torque correction value (feedback correction torque) of a plurality of first motor generators 4 and a torque correction value (feedback correction torque) of the second motor generator 5 based on a deviation between the actual engine rotation speed and the target engine rotation speed and sets the ratio between the torque correction value of the first motor generator 4 and the torque correction value of the second motor generator 5 so as to be a ratio that is based on the lever ratio of the differential gear mechanism 8 that is a power input/output device.

Accordingly, the drive control device 1 of the hybrid vehicle offsets the change of the torque of the internal combustion engine 2 with the driving shaft 7 as a supporting point by using the torque balance equation that is in consideration of a change in the torque, and accordingly, even when a change of the torque of the internal combustion engine 2 occurs, it does not affect the torque of the driving shaft 7.

The inertia of the internal combustion engine 2, the inertia 4 of the first motor generator, and the inertia of the second motor generator 5 are acquired in advance through measurements and are stored inside.

In addition, the drive control device 1 sets feedback correction amounts set to the torque instruction values of a plurality of the first and second motor generators 4 and 5 based on the gear ratio or the lever ratio of the differential gear mechanism 8 including four rotating components 34 to 37 connected to a plurality of the first and second motor generators 4 and 5, the driving shaft 7, and the internal combustion engine 2 in association with each other.

In the above-described torque balance equation, as represented in Equation (4) described above, the target torques (torque instruction values) of a plurality of the first and second motor generators 4 and 5 and the target engine torque of the internal combustion engine 2 are balanced based on the lever ratio that is based on the gear ratio of the differential gear mechanism 8 that is a power input/output device that mechanically operates and connects a plurality of the first and second motor generators 4 and 5 and the internal combustion engine 2.

The differential gear mechanism 8 as the power input/output device aligns the four rotating components 34 to 37 in order of the first rotating component 34 connected to the first motor generator 4, the second rotating component 35 connected to the internal combustion engine 2, the third rotating component 36 connected to the driving shaft 7, and the fourth rotating component 37 connected to the second motor generator 5 in order in the alignment chart and the mutual lever ratio of such rotating components is arranged as k1:1:k2 in the same order.

Then, the torque correction value of the first motor generator 4 and the torque correction value of the second motor generator 5 are set so as to maintain the relation in which a value acquired by multiplying the torque correction value of the first motor generator 4 by k1 is the same as a value acquired by multiplying the torque correction value of the second motor generator 5 by (1+k2). The torque balance equation can be appropriately used in a case where the differential gear mechanism 8 including four rotating components 34 to 37 similar to each other having mutually-different lever ratios is configured.

From this, the drive control device 1 of the hybrid vehicle can control a plurality of the first and second motor generators 4 and 5 in a case where battery 20 is charged or discharged. In consideration of the engine operating point of the internal combustion engine 2, both the target driving force and the target charging/discharging can be secured. By finely correcting the torque instruction values of the plurality of the first and second motor generators 4 and 5, the engine rotation speed can converge on a target value in a speedy manner. In addition, the engine operating point can match the target operating point, and accordingly, an appropriate operation state can be formed.

The drive control device 1 of the hybrid vehicle includes the delaying means 49 that determines a decrease in the requested torque based on the accelerator opening degree detected by the accelerator opening degree detecting means 39 and delays the target engine torque applied to the motor torque instruction value calculating means 48 in a case where the decrease in the requested torque is determined.

The delaying means 49, as illustrated in FIG. 3, is arranged in accompaniment with the motor torque instruction value calculating means 48. The delaying means 49 may be arranged as an internal function for inputting the target engine torque to the second calculation unit 51 that calculates the basic torque Tmg1$i$ of the first motor generator 4 or may be arranged as an external device on a previous stage of the input of the target engine torque.

The delaying means 49 primarily buffers the target engine torque values sequentially output from the target engine operating point setting means 47, maintains the target engine torque value during the elapse of a set delay time, and outputs the target engine torque values that have been primarily buffered (delayed) in the same order as the input order after the elapse of the set delay time. At the timing when the delay ends, the input is the same as the output. Accordingly, the motor torque instruction value calculating means 48 controls a plurality of the first and second motor generators 4 and 5 using a value different from the target engine operating point calculated by the target engine operating point setting means 47 during the elapse of the delay time and during the elapse of the time until returning thereafter.

As illustrated in the time chart represented in FIG. 19, the drive control device 1 immediately decreases the driving torque (motor torque instruction value) of the second motor generator 5 responsible for vehicle driving based on a decrease in the requested torque of the driver and increases negative torque of the driving torque (motor torque instruction value) of the first motor generator 4 in consideration of the torque balance with the internal combustion engine 2 for which a control delay occurs during the elapse of the set delay time. After the elapse of the set delay time, in accordance with a decrease in the torque of the internal combustion engine 2 on which the decrease in the torque is reflected, the driving torque (motor torque instruction value) of the first motor generator 4 that is in consideration of the torque balance decreases the negative torque.

As above, the drive control device 1 of the hybrid vehicle determines a decrease in the requested torque (target driving force) of the driver and estimates a change (a delay time or a decrease tendency) of the engine torque, thereby matching the timing of a change in the torque instruction values of the first and second motor generators 4 and 5 and the timing of a state change in the internal combustion engine 2 each other. Accordingly, the rotation is stabilized, and the drivability can be improved.

In addition, the delaying means 49 sets a delay time for the delaying of the target engine torque and changes the delay time in accordance with the target engine rotation speed. Thus, the delaying means 49 decreases the delay time in a case where the target engine rotation speed is high and increases the delay time in a case where the target engine rotation speed is low.

From this, the drive control device 1 of the hybrid vehicle can appropriately control the torques of the first and second motor generators 4 and 5 in accordance with the response delay time of the internal combustion engine 2.

INDUSTRIAL APPLICABILITY

The present invention can match the timing at which the torque instruction values of a plurality of motor generators change and the timing of a state change of the internal combustion engine and accordingly, can stabilize the rotation and improve the drivability, and thus the present invention can be applied to the control of a driving force of a hybrid vehicle.

REFERENCE SIGNS LIST 1 drive control device of hybrid vehicle
2 internal combustion engine
3 output shaft
4 first motor generator
5 second motor generator
7 driving shaft
8 differential gear mechanism
18 first inverter
19 second inverter
20 battery
21 first planetary gear mechanism
22 second planetary gear mechanism
31 one-way clutch
32 output unit
34 first rotating component
35 second rotating component
36 third rotating component
37 fourth rotating component
38 drive control unit
39 accelerator opening degree detecting means
40 vehicle speed detecting means
41 engine rotation speed detecting means
42 battery charge state detecting means
43 target driving force setting means
44 target driving power setting means
45 target charge/discharge power setting means
46 target engine power calculating means
47 target engine operating point setting means
48 motor torque instruction value calculating means
49 delaying means

The invention claimed is:

1. A drive control device of a hybrid vehicle comprising:
   an internal combustion engine that includes an output shaft;
   a driving shaft that is connected to a drive wheel;
   first and second motor generators;
   a differential gear mechanism that includes four rotating components connected to a plurality of the motor generators, the driving shaft, and the internal combustion engine;
   an accelerator opening degree detecting means that detects the accelerator opening degree;
   a vehicle speed detecting means that detects a vehicle speed;
   a battery charge state detecting means that detects a charge state of a battery;
   a target driving power setting means that sets target driving power based on the accelerator opening degree that is detected by the accelerator opening degree detecting means and the vehicle speed detected by the vehicle speed detecting means;
   a target charge/discharge power setting means that sets target charge/discharge power based on at least the charge state of the battery that is detected by the battery charge state detecting means;
   a target engine power calculating means that calculates target engine power using the target driving power setting means and the target charge/discharge power setting means;
   a target engine operating point setting means that sets a target engine operating point based on the target engine power and total system efficiency; and
   a motor torque instruction value calculating means that sets torque instruction values of the plurality of the motor generators,
   wherein the motor torque instruction value calculating means calculates torque instruction values of the plurality of motor generators using a torque balance equation including target engine torque required at the target engine operating point and an electric power balance equation including the target charge/discharge power and allows feedback correction of the torque instruction values of the plurality of the motor generators to be performed such that an actual engine rotation speed converges on a target engine rotation speed required at the target engine operating point, and
   wherein a delaying means that determines a decrease in requested torque based on the accelerator opening degree detected by the accelerator opening degree detecting means and delays the target engine torque applied to the motor torque instruction value calculating means in a case where the decrease in the requested torque is determined is arranged.

2. The drive control device of a hybrid vehicle according to claim 1,
   wherein the delaying means sets a delay time for the delaying of the target engine torque and changes the delay time in accordance with the target engine rotation speed, and
   wherein the delay time is set to be short in a case where the target engine rotation speed is high, and the delay time is set to be long in a case where the target engine rotation speed is low.

* * * * *